(No Model.)

R. P. MARTINEZ.
ELASTIC VEHICLE TIRE.

No. 486,230. Patented Nov. 15, 1892.

WITNESSES:
R. B. Hirst.
H. C. Kimball

INVENTOR
Richard Pazos Martinez.

BY
J. Curtis Gillespie
ATTORNEY

UNITED STATES PATENT OFFICE.

RICHARD PAZOS MARTINEZ, OF BROOKLYN, NEW YORK.

ELASTIC VEHICLE-TIRE.

SPECIFICATION forming part of Letters Patent No. 486,230, dated November 15, 1892.

Application filed March 18, 1892. Serial No. 425,456. (No model.)

*To all whom it may concern:*

Be it known that I, RICHARD PAZOS MARTINEZ, a citizen of the United States, and a resident of Brooklyn, in the county of Kings and State of New York, have invented certain new and useful Improvements in Elastic Vehicle-Tires, of which the following is a specification, reference being had to the accompanying drawings, in which—

Figure 1:
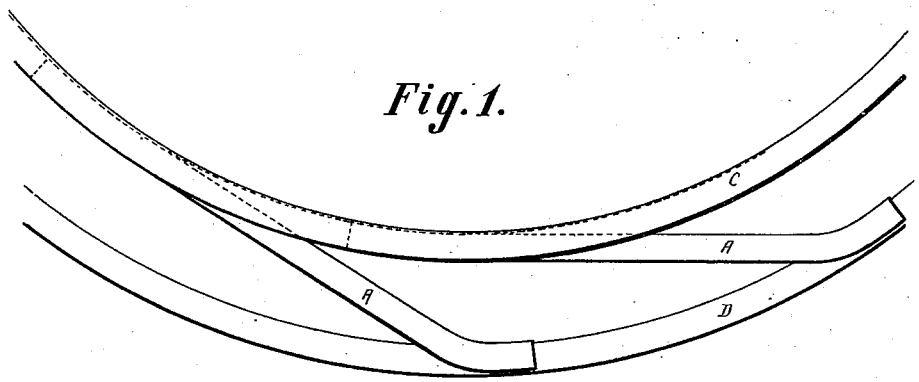
Figure 2:

Figure 1 is a side view of my improved elastic vehicle-tire, and Fig. 2 is an enlarged transverse sectional view of a spring A and the inner and outer tires C and D.

Similar letters indicate similar parts.

My invention relates to an improvement in an elastic vehicle-tire of a kind for which United States Letters Patent were granted to me on the 8th day of March, 1892, No. 470,249; and it consists in providing a means for constructing said tires so as to produce the best results in operation and lightest weight consistent with strength, the latter being a very essential feature for bicycles, tricycles, &c.; and I accomplish this end by employing, as indicated in my former patent, an inner and an outer tire connected by multitudinous tangential straight-bar springs rigidly secured at an acute angle to both tires, all to be formed of corrugated material, preferably spring-steel, said corrugation to represent in general the letter U in transverse section. (Indicated in Fig. 2.) I do not limit myself to this identical form of corrugation, its number, proportions, nor dimensions, and while I am aware that this means of increasing the strength of materials in proportion to weight has been used before I believe its employment in the construction of elastic vehicle-tires, springs, &c., is new, useful, and novel, and I desire to secure the same by United States Letters Patent.

I claim—

In an elastic vehicle-tire, the combination of multitudinous tangential straight-bar springs rigidly secured at an acute angle to an inner and an outer tire, said tires and springs so longitudinally corrugated that they will be materially strengthened in proportion to their weight, substantially as and for the purposes shown and described.

Signed at Brooklyn, in the county of Kings and State of New York, this 17th day of March, A. D. 1892.

RICHARD PAZOS MARTINEZ.

Witnesses:
   JAMES WRIGHT,
   JOHN BARTER BLISS.